(12) United States Patent
Jodoin et al.

(10) Patent No.: US 9,684,228 B2
(45) Date of Patent: Jun. 20, 2017

(54) DYNAMIC ROTATION MONOPOD

(71) Applicant: Edispin Inc., Kanata, ON (CA)

(72) Inventors: Tim Jodoin, Kanata (CA); Jeff Pinard, Toronto (CA)

(73) Assignee: EDISPIN, INC., Kanata, Ontario (CA)

( * ) Notice: Subject to any disclaimer, the term of this patent is extended or adjusted under 35 U.S.C. 154(b) by 0 days.

(21) Appl. No.: 14/865,557

(22) Filed: Sep. 25, 2015

(65) Prior Publication Data

US 2016/0091779 A1   Mar. 31, 2016

Related U.S. Application Data

(60) Provisional application No. 62/055,653, filed on Sep. 26, 2014.

(51) Int. Cl.
*G03B 17/56* (2006.01)

(52) U.S. Cl.
CPC ......... *G03B 17/561* (2013.01); *G03B 17/563* (2013.01)

(58) Field of Classification Search
USPC .......................................................... 396/428
See application file for complete search history.

(56) References Cited

U.S. PATENT DOCUMENTS

| | | | | | |
|---|---|---|---|---|---|
| 3,128,982 | A | * | 4/1964 | Christopher | F16M 11/32 248/183.1 |
| 4,097,883 | A | * | 6/1978 | Adamski | G03B 17/563 248/178.1 |
| 5,065,249 | A | * | 11/1991 | Horn | F16M 11/04 348/375 |
| 5,128,770 | A | * | 7/1992 | Inana | F16M 11/10 348/211.4 |
| 5,839,704 | A | * | 11/1998 | Appleman | F16M 13/04 224/584 |
| 6,663,298 | B2 | * | 12/2003 | Haney | G03B 17/00 396/419 |
| 7,111,424 | B1 | * | 9/2006 | Moody | F41A 23/08 248/171 |
| 8,783,975 | B1 | * | 7/2014 | Cifers | F16M 11/14 396/428 |
| 9,146,005 | B1 | * | 9/2015 | Swanson | F16M 13/04 |
| 2009/0003822 | A1 | * | 1/2009 | Tyner | F16M 11/32 396/428 |
| 2013/0100341 | A1 | * | 4/2013 | Codd | B66F 11/048 348/373 |

* cited by examiner

*Primary Examiner* — Clayton E Laballe
*Assistant Examiner* — Linda B Smith
(74) *Attorney, Agent, or Firm* — Brion Raffoul

(57) ABSTRACT

The handheld telescopic dynamic rotation monopod is an essential tool for photography and videography enthusiasts, comprised of an easy to use control member positioned in the handle, whose rotation will engender a corresponding horizontal rotation from a camera mount positioned at the opposite end of the handle. A lockable vertical rotation of said camera mount is achieved by means of an input and output section, one able to pivot relative to the other due to guide pins restrictedly able to move within guide tracks and studs to restrictedly move within elongated channels.

16 Claims, 18 Drawing Sheets

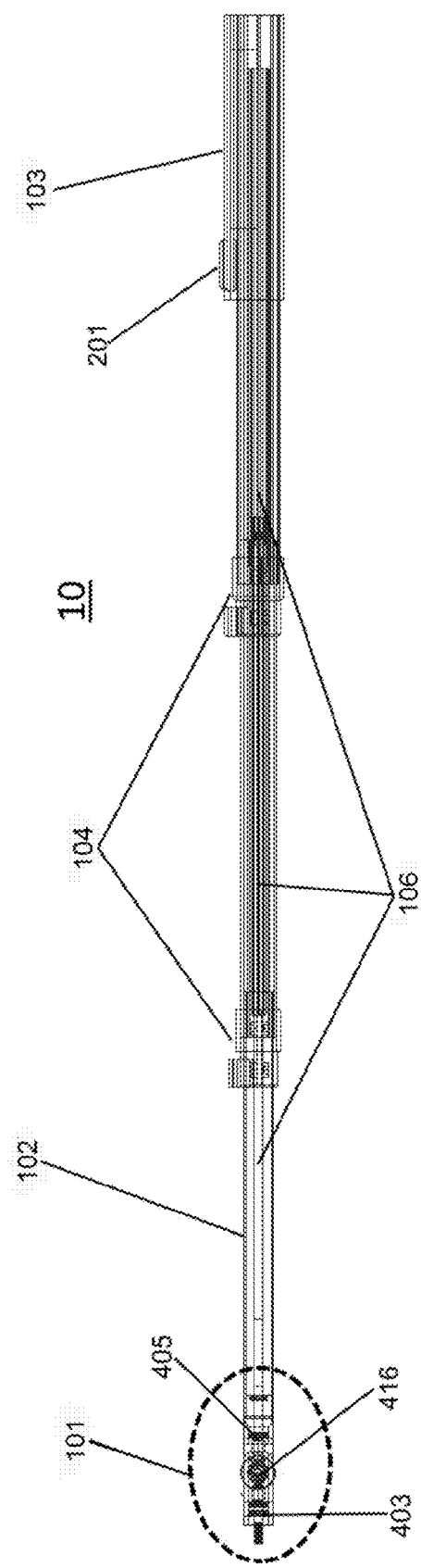

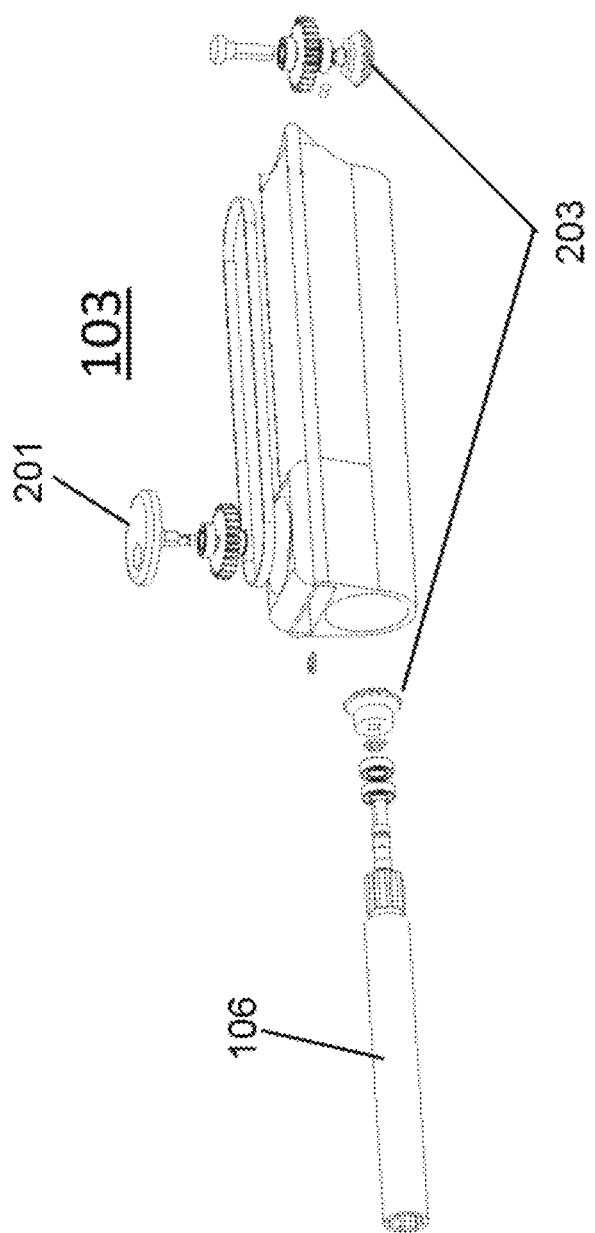

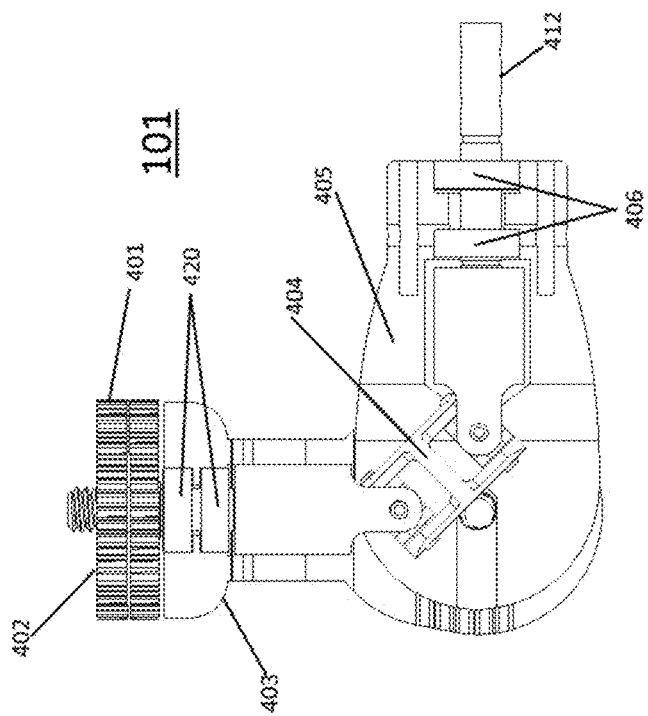
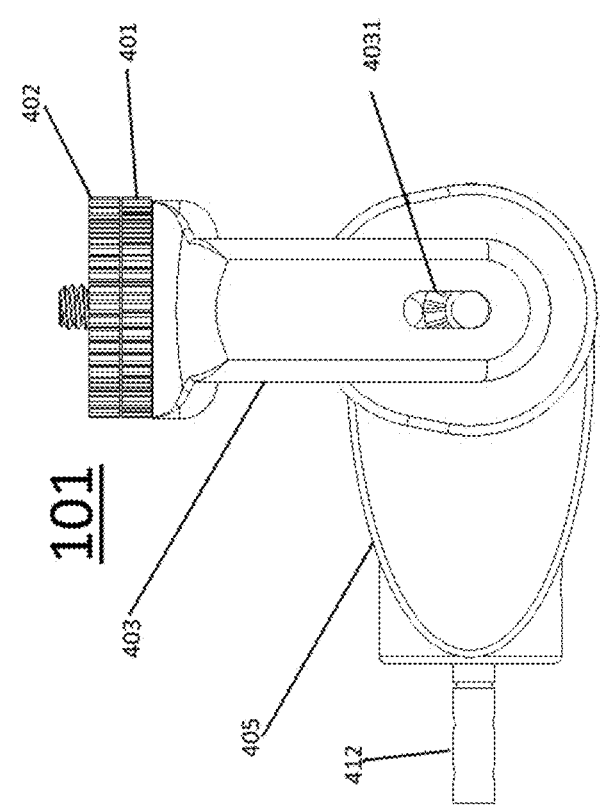
Fig. 7B
Fig. 7A

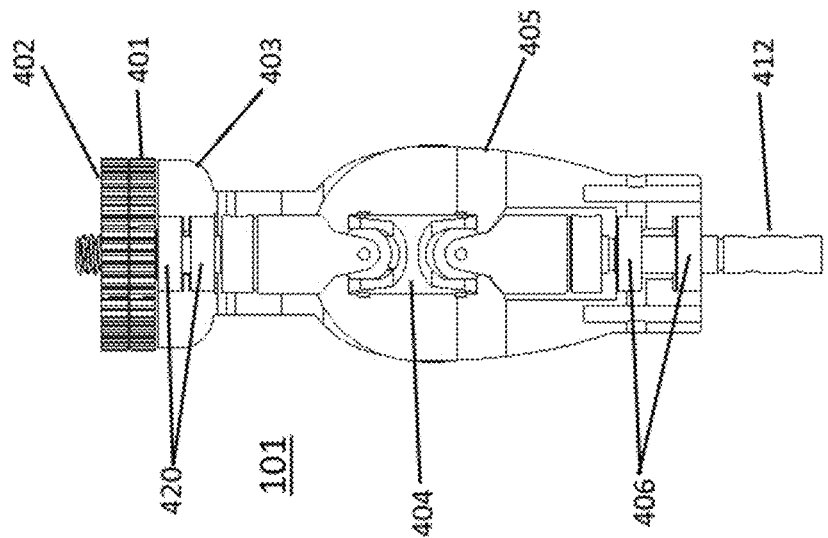
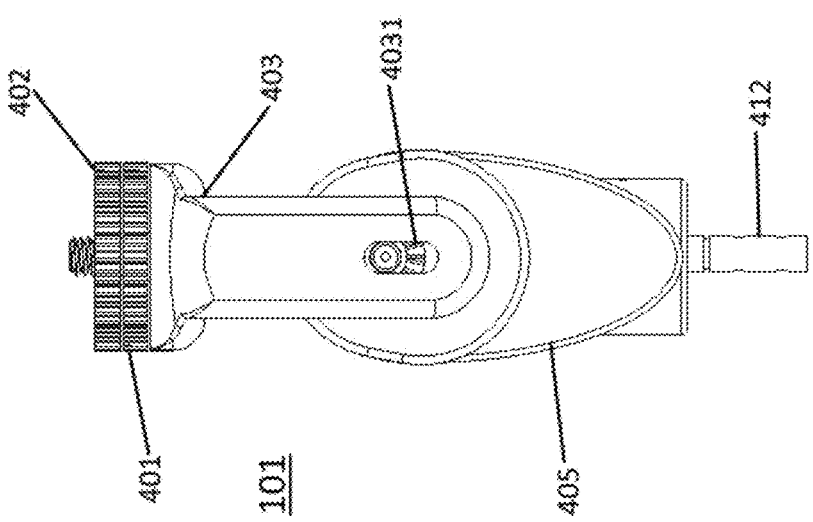
Fig. 7C
Fig. 7D

DYNAMIC ROTATION MONOPOD

CROSS-REFERENCE TO RELATED APPLICATIONS

This application claims the benefit of priority under 35 U.S.C. §119(e) to U.S. Provisional Patent Application No. 62/055,653, filed on Sep. 26, 2014, which is hereby incorporated by reference in its entirety.

FIELD

This invention relates to videography and photography, and more specifically, to a monopod providing a control system for the vertical and horizontal rotation of a camera.

BACKGROUND

Telescoping camera mounts have been around since the 1800's. These mounts started as large tripods, but as cameras became smaller, they migrated to smaller lighter hand held versions that simply extend the length of your arm. The missing functionality all of these mounts shared was the inability to change the rotational angle of the camera on the fly from the opposite end of a telescoping pole, while still maintaining the ability to telescope.

This invention allows users to control the angle of a digital video or audio recording device at the end of a telescoping pole in real time from a control mechanism on the handle. While still allowing for the pole to be collapsed for easy transportation.

SUMMARY

In a further aspect, this document discloses a dynamic rotating monopod comprising:
a. a handle comprised of:
  i. a directional control member to pivotally control a camera; and,
  ii. a right angle gear drive assembly;
b. a pole connected to the handle further comprised of a drive shaft to transfer motion from the directional control member to the camera; and,
c. a rotating camera mount connected to the pole to pivot the camera, the rotating camera mount further comprised of an input section and an output section;
wherein the input section is operatively connected to the drive shaft and the output section is connected to the camera; and
wherein actuating the directional control member correspondingly pivots the camera.

In one aspect, the present device provides a dynamic rotating monopod comprising a handle further comprised of a directional control member to pivotally control a camera; a pole connected to the handle further comprised of a drive shaft to transfer motion from the directional control member to the camera; and, a rotating camera mount connected to the pole and operatively connected to the drive shaft to pivot the camera, wherein actuating the directional control member correspondingly pivots the camera.

In another aspect, the present device provides a camera mount for securing a camera, comprising an output section to pivot a camera, further comprised of at least two elongated channels; and, at least two guide pins to allow for the pivoting of the output section; and, an input section for receiving an input shaft, further comprised of at least two guide tracks to receive the at least two guide pins; and, at least two studs to penetrate the at least two elongated channels, wherein the at least two guide pins restrictedly move along the at least two guide tracks and the at least two studs restrictedly move along the at least two elongated channels to (control the movement) (allow for 180-degree movement) of the output section relative to the input section.

BRIEF DESCRIPTION OF THE DRAWINGS

FIG. 1B is a top cross-sectional view of a telescopic dynamic rotation monopod according to an embodiment of the present device;

FIG. 2A is an exploded perspective view of a handle end of a telescopic dynamic rotation monopod according to an embodiment of the present device;

FIG. 7A is a side view of a camera mount rotated at a 90-degree angle of a telescopic dynamic rotation monopod according to another embodiment of the present device;

FIG. 7B is a side cross-sectional view of a camera mount rotated at a 90-degree angle of a telescopic dynamic rotation monopod according to another embodiment of the present device;

FIG. 7C is side view of a camera mount rotated at a 180-degree angle of a telescopic dynamic rotation monopod according to another embodiment of the present device;

FIG. 7D is a side cross-sectional view of a camera mount rotated at a 180-degree angle of a telescopic dynamic rotation monopod according to another embodiment of the present device;

DETAILED DESCRIPTION

As used herein in the specification, "Non-rotational configuration" refers to a telescoping member with a body structure such that the member segments that make up the telescoping member are unable to rotate independently from the group, but the telescoping member itself can rotate as a one-piece unit. The use of the word non-rotational in this fashion is well known in the art.

As used herein in the specification, "Pole segment" refers to a single section of tube that with the addition of more pole segments would make up a telescoping pole.

Figure 1A:
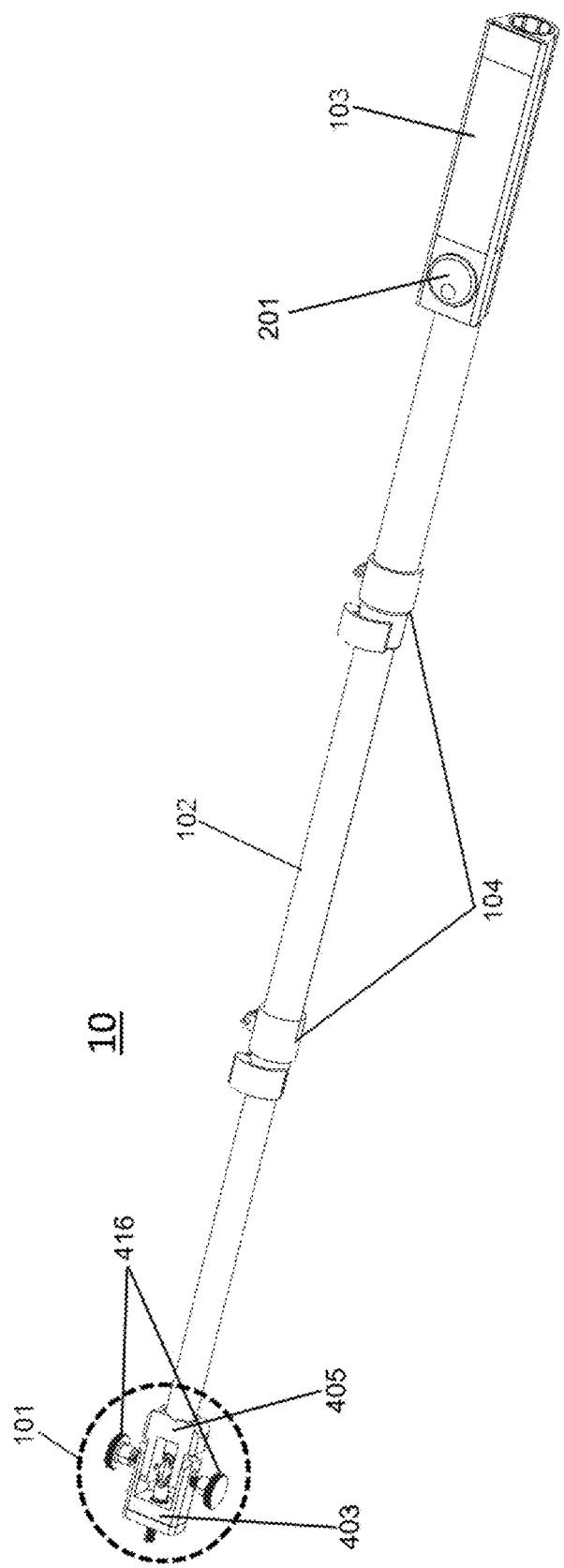
FIG. 1A is a perspective view of a telescopic dynamic rotation monopod according to an embodiment of the present device.
Figure 5A:
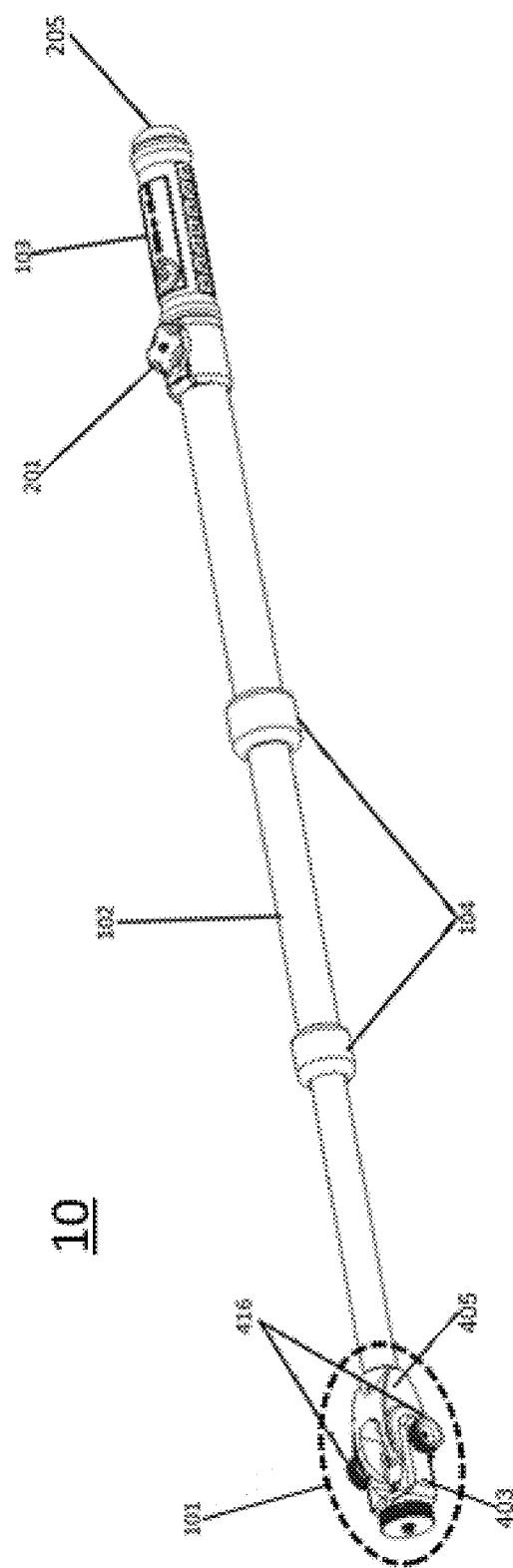
FIG. 5A is a perspective view of a telescopic dynamic rotation monopod according to another embodiment of the present device.
Figure 5B:
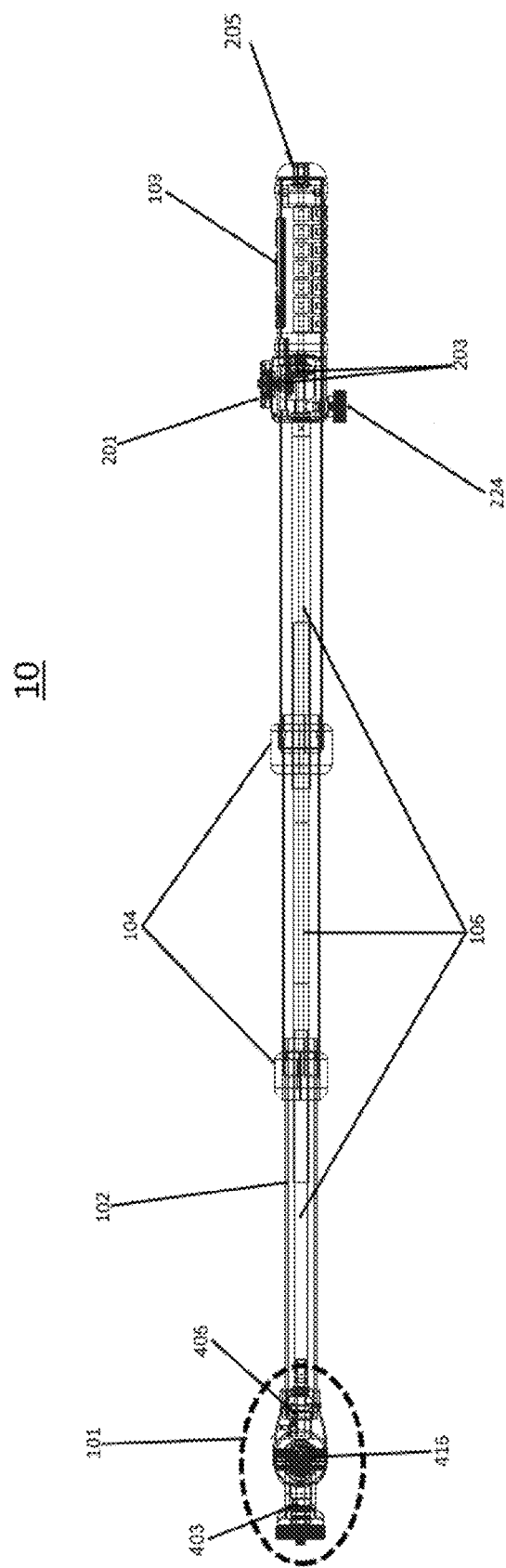
FIG. 5B is a side cross-sectional view of a telescopic dynamic rotation monopod according to another embodiment of the present device.

With reference to FIGS. 1A, 1B, 5A and 5B, a telescopic dynamic rotation monopod 10 is shown, generally comprised of a universal rotating camera mount 101, positioned at an opposite end of a hand held telescoping pole 102. The monopod 10 is further comprised of a directional control member 201 positioned on a handle 103, which is connected to a non-rotational telescoping member 106 by means of a miter gear set 203. In this embodiment, the directional control member 201 is in the form of a circle but could be in other forms. The non-rotational telescopic member 106 is mounted inside the telescoping pole 102, said telescoping pole 102 having a larger diameter in order to fit said telescopic member 106 within it, and which connects to the universal rotating camera mount 101. The camera mount 101 is able to transfer the rotational force from the inner telescoping member 106 to the media device (not shown). The static angle of the camera mount 101 can be adjusted by loosening the thumb nuts 416 and rotating an output section 403 of the camera mount 101 from 90 to −90 degrees with respect to an input section 405, the specific functioning thereof which will be further explained below. The monopod 10 is further comprised of an end cap 205, which has a threaded over molded insert well known in the art, for attaching various accessories such as tripods, counter weights, zero buoyancy floats, sports equipment mounts and extension poles. A set of collars locks 104 are positioned along the telescopic pole 102 in order to adjust the length of said pole 102. A worker skilled in the art would appreciate that the length of the outer telescoping pole 102 can be adjusted and fixed to a set length by tightening said collar locks 104. A worker skilled in the relevant art would further appreciate that the outer telescoping pole 102 is the main telescope, and joins the handle 103 to the universal rotating camera mount 101. The outer telescoping pole 102 can consist of two or more pole segments each sized to fit one inside the other and each one fitted with a telescoping collar lock 104. The telescoping collar lock 104 allow the telescoping pole 102 to be sized to any desired length within the limitations of the design then locked in place.

Figure 2B:
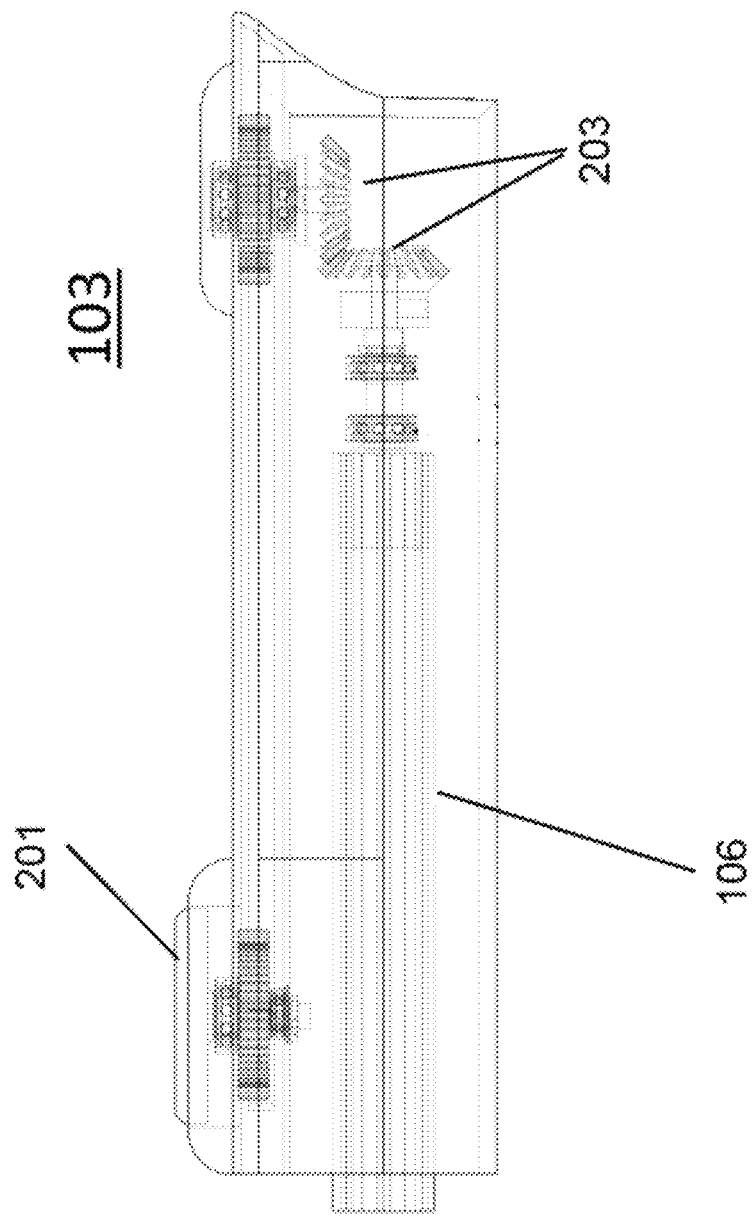
FIG. 2B is side cross-sectional view of a handle end of a telescopic dynamic rotation monopod according to an embodiment of the present device.
Figure 6A:
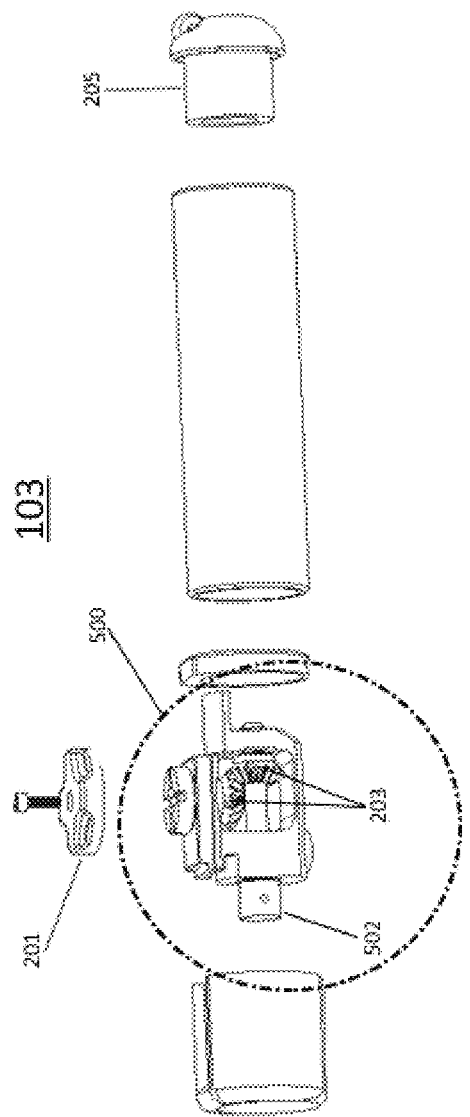
FIG. 6A is a perspective exploded view of a handle of a telescopic dynamic rotation monopod according to another embodiment of the present device.
Figure 6B:
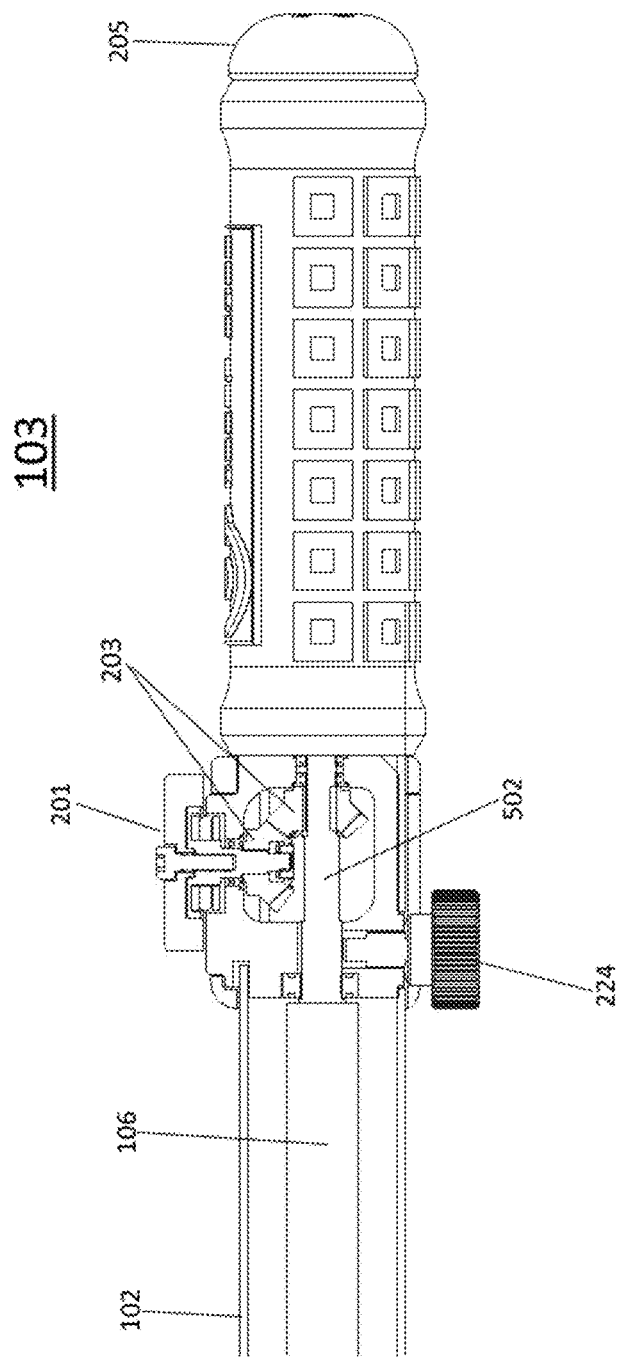
FIG. 6B is a side, half cross-sectional view of a handle of a telescopic dynamic rotation monopod according to another embodiment of the present device.

With reference to FIGS. 2A, 2B, 6A and 6B the handle 103 is shown in greater detail, comprised of a directional control wheel 201, which transfers its rotational force into a right angle gear drive assembly 500, said right angle gear drive assembly 500 being comprised of a miter gear set 203 and a stabilized drive shaft 502. The head of the stabilized drive shaft 502 is constructed and arranged to fit inside and with a set screw (not shown), fastened to the non-rotational inner telescoping member 106 which runs up the center of the larger diameter outer telescoping pole 102. The stabilized drive shaft 502 can be locked in place by tightening a tension thumb wheel 224, screwed into the bottom of right angle gear drive assembly 500.

Figure 3A:
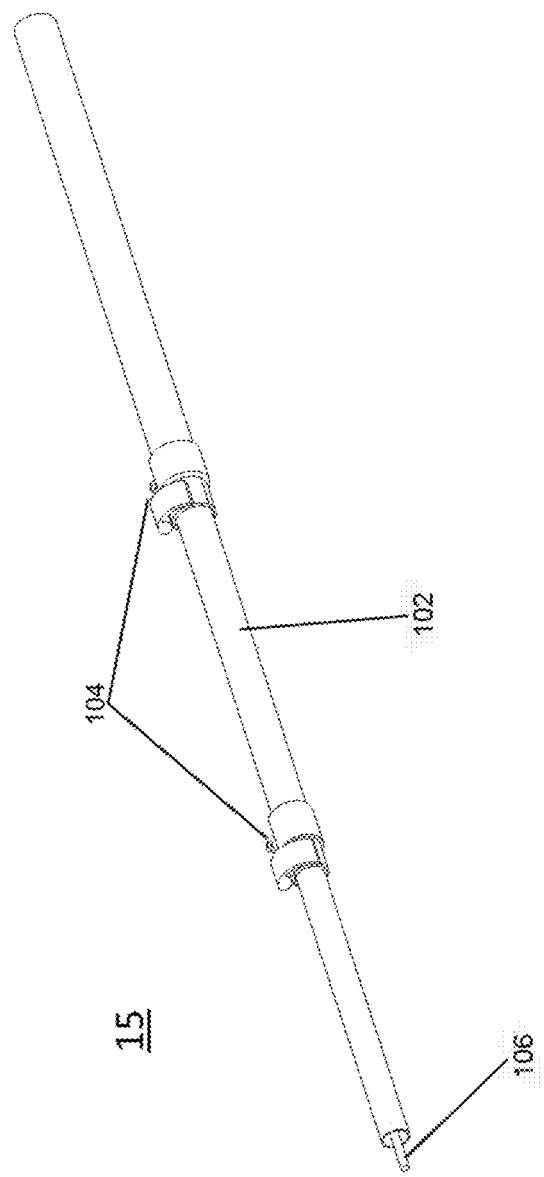
FIG. 3A is a perspective view of a telescopic pole of a telescopic dynamic rotation monopod according to an embodiment of the present device.
Figure 3B:
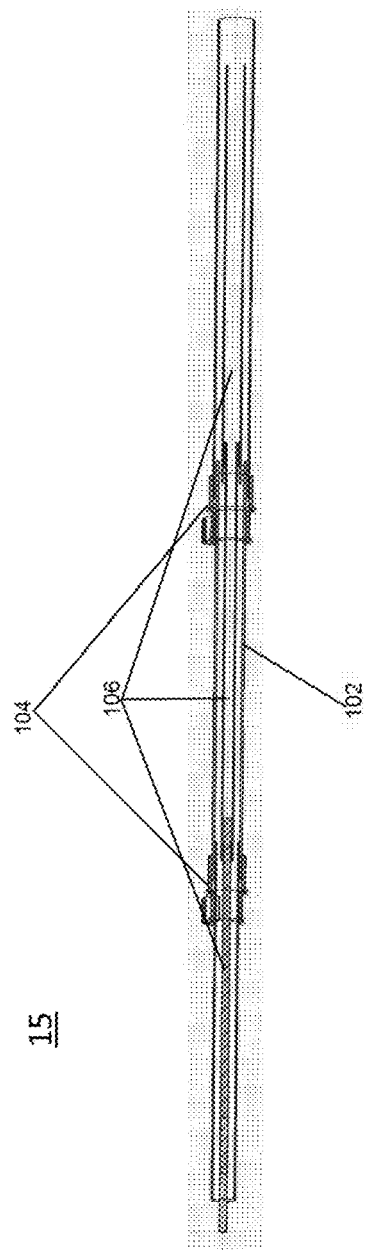
FIG. 3B a side cross-sectional view of a telescopic pole of a telescopic dynamic rotation monopod according to an embodiment of the present device.
Figure 7F:
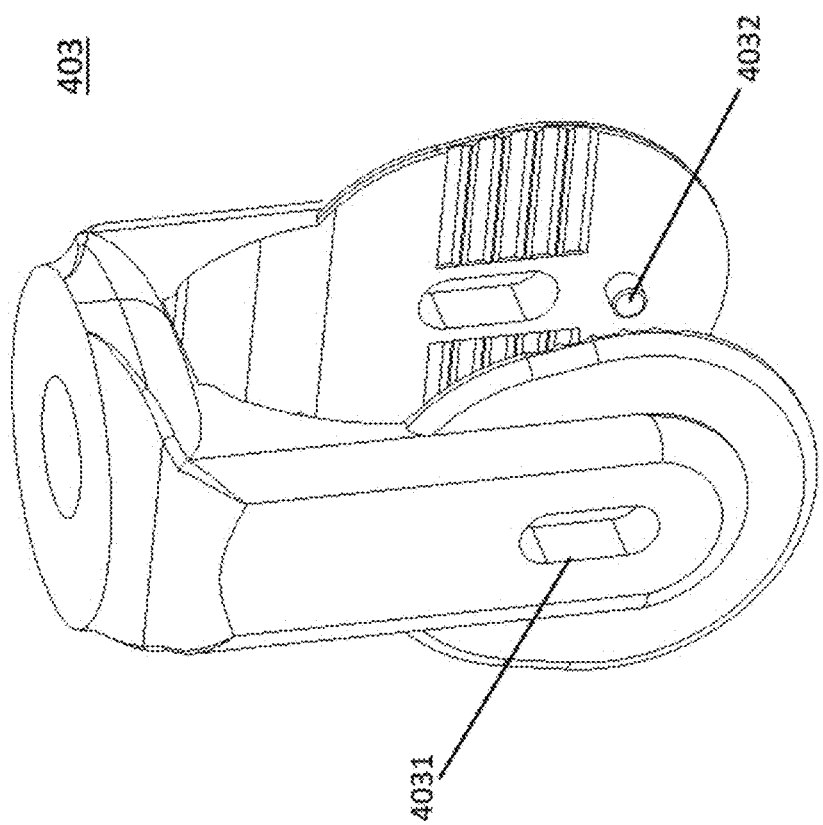
FIG. 7F is another perspective view of a hinge joint of a camera mount of a telescopic dynamic rotation monopod according to another embodiment of the present device.

With reference to FIGS. 3A, 3B, 6A, 6B, 7A, 7B, 7C, 7D the smaller non-rotational telescoping member 106 is suspended in the center of the telescoping pole 102 by its attachment to the input shaft 412 of the camera mount 101 and to the stabilized driveshaft 502 of the right angle gear drive assembly 500. The outer telescoping pole 102 is the main telescope and it joins the handle 103 which contains the directional control 201 to the camera mount 101. The smaller inside non-rotational telescoping member 106 works as a drive train to transfer the rotational force from a directional control 201 located on the handle 103 side to a universal rotating camera mount 101 on the opposing side. A worker skilled in the relevant art would appreciate that in another embodiment, the outer telescoping pole 102 may have collar locks 104 to allow the pole 102 to be locked at static lengths.

With reference to FIGS. 5A, 5B, 6A and 6B, the directional control wheel 201 is mounted on the handle 103 end of the telescoping pole 102. It allows the user to manipulate a control wheel 201 with their thumb or finger and have that mechanical action initiate the rotation of the inner telescoping member 106 with respect to the outer telescoping pole 102. The control wheel 201 is fixed to a miter gear set 203 and mounted at the handle 103 of the outer telescoping pole 102. Said control wheel 201 transfers the rotational force from the user's finger or thumb to an inner telescoping member 106 mounted by way of the stabilized drive shaft 502 located in the right angle gear drive assembly 500 inside the telescoping member 102. The inner telescoping member 106 has a non-rotational configuration that allows it to only rotate as a single unit while still maintaining its telescopic properties and the ability to rotate independently with respect to the larger diameter outer telescoping pole 102. The largest diameter of the inner telescoping member 106 segment is optimally at least 4 mm smaller than the inside diameter of the smallest outer telescoping pole 102 segment. This sizing consideration will allow the inner telescoping member 106 to easily slide inside the outer telescoping pole 102 when it is configured to its minimal length.

Figure 4A:
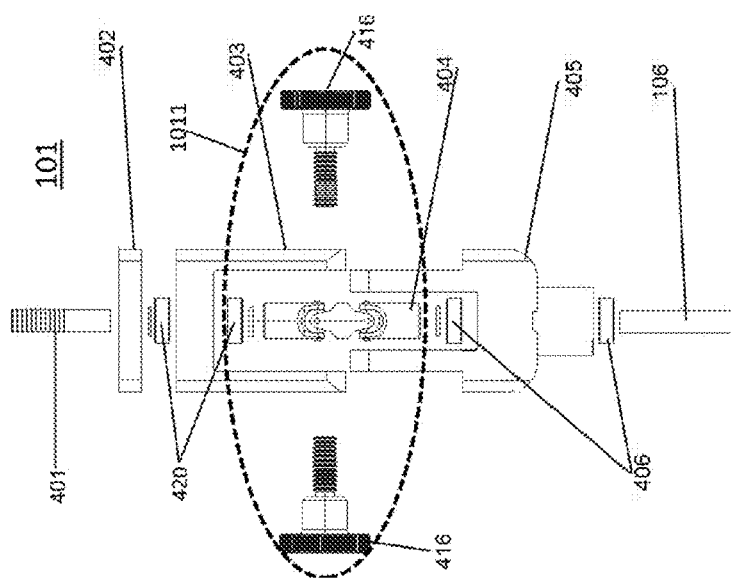
FIG. 4A is a top view of a double U-joint of a telescopic dynamic rotation monopod according to an embodiment of the present device.
Figure 4B:
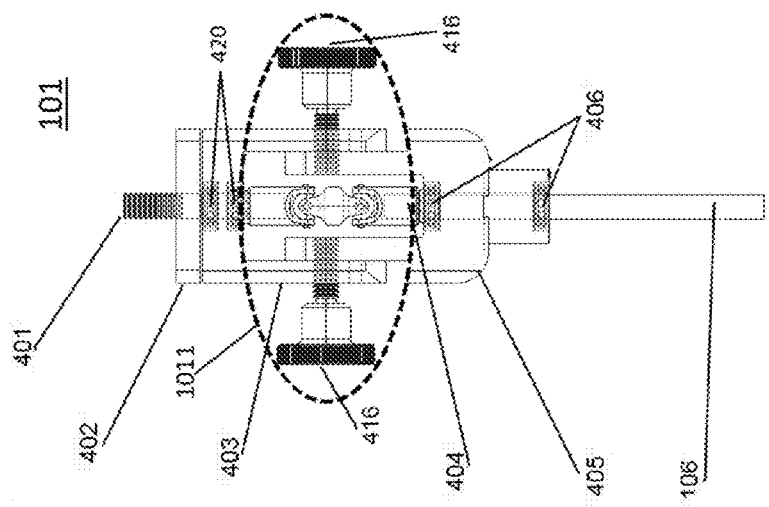
FIG. 4B is a top cross-sectional view of a double U-joint of a telescopic dynamic rotation monopod according to an embodiment of the present device.
Figure 7E:
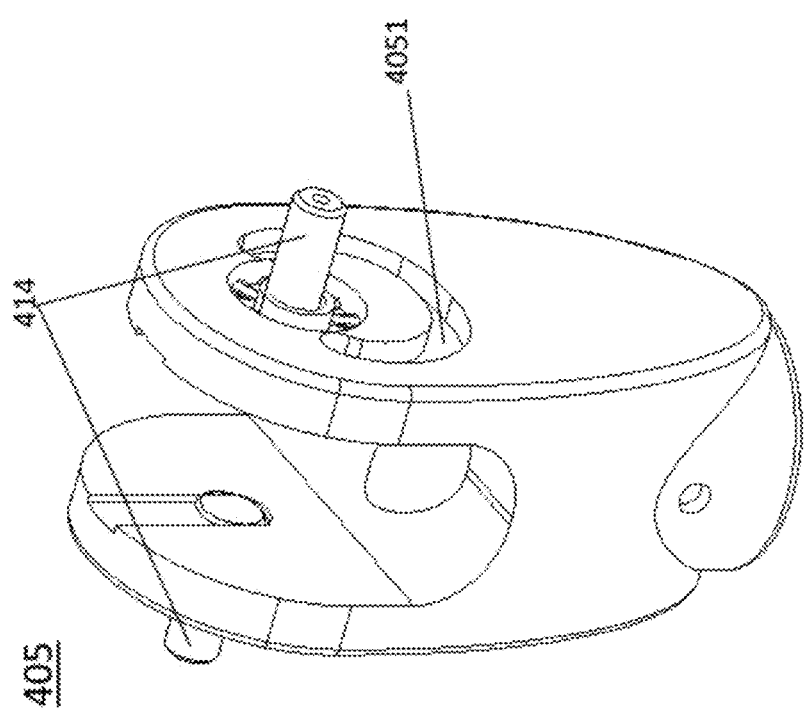
FIG. 7E is a perspective view of a hinge joint of a camera mount of a telescopic dynamic rotation monopod according to another embodiment of the present device.
Figure 7H:
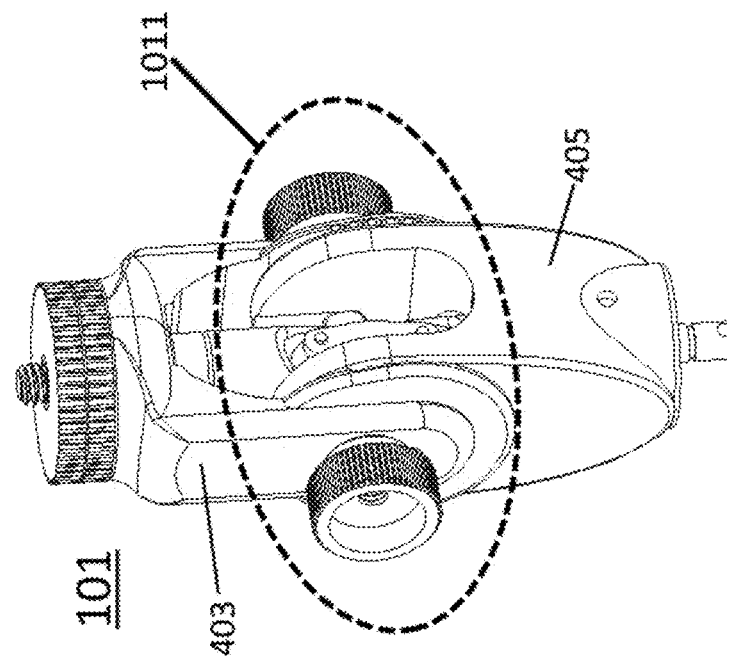
FIG. 7H is a perspective view of a camera mount rotated at a 180-degree angle of a telescopic rotation monopod according to another embodiment of the present device.
Figure 7G:
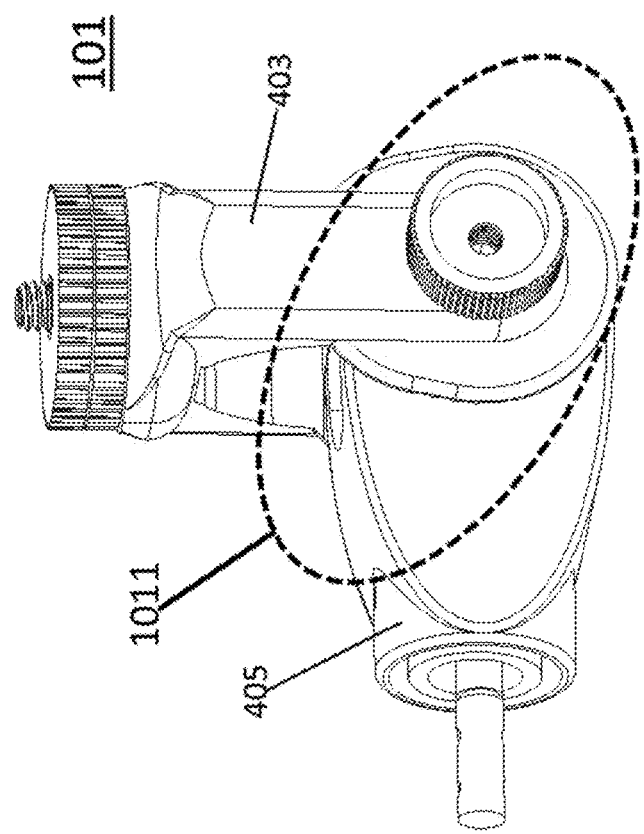
FIG. 7G is a perspective view of a camera mount rotated at a 90-degree angle of a telescopic dynamic rotation monopod according to another embodiment of the present device.
Figure 8B:
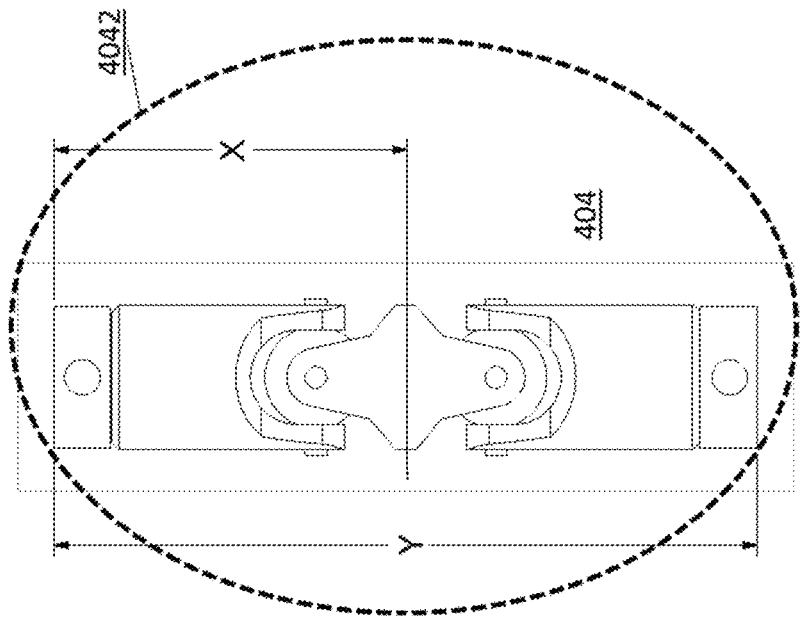
FIG. 8B is a top view of a double U-joint rotated at a 190-degree angle of a telescopic dynamic rotation monopod according to another embodiment of the present device; and, FIG. 9 is an exploded view of a camera mount of a telescopic dynamic rotation monopod according to another embodiment of the present device.
Figure 8A:
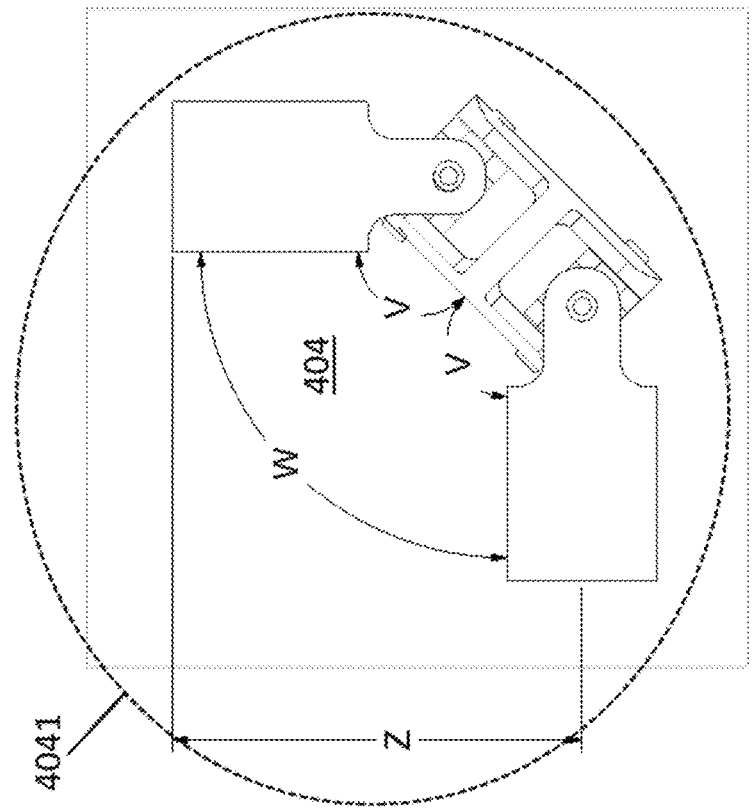
FIG. 8A is a side view of a double U-joint rotated at a 90-degree angle of a telescopic dynamic rotation monopod according to another embodiment of the present device.

With reference to FIGS. 4A, 4B, 7E, 7F, 7G, 7H, 8A and 8B the universal rotating camera mount 101 is generally comprised of an input section 405 and an output section 403. The input and output sections 405, 403 join to make up a hinge joint 1011. The hinge joint 1011 allows easy angle adjustment of the output section 403 with respect to the input section 405 and can be locked in a fixed positioned by tightening thumb nuts 416 one to the other, initiating sufficient clamping force between input section 405 and output section 403 to firmly hold the desired angle. The input section 405 of the universal rotating camera mount 101 has an input shaft 412 that at one end connects to a double U-joint 404 and at the other end connects to the inner telescoping member 106 by a set screw (not shown). The input shaft 412 is kept stable and aligned by a parallel bearing set 406. The output section 403 of the universal rotating camera mount 101 has an output shaft 401 with threaded camera mount 101 and tension plate 402 for attaching any media device (not shown) equipped with industry standards. The output shaft 401 is kept stable and aligned by a parallel bearing set 420. A double U-joint 404 creates the link between the input shaft 412 and output shaft 401. The double U-joint 404 can transfer rotation at a 90-degree angle or straight, 180-degree angle. This double universal joint 404 configuration allows rotational force to be transfer from the inner telescoping member 106 to a camera (not shown) at any fixed angle of the hinge joint 1011 position between +90 and −90 degrees. In another embodiment, the double U-joint 404 would be replaced with an alternate form of flexible drive shaft such flexible drive shafts, spring linkage, flex couple shafts, or other similar parts known in the art.

Figure 9:
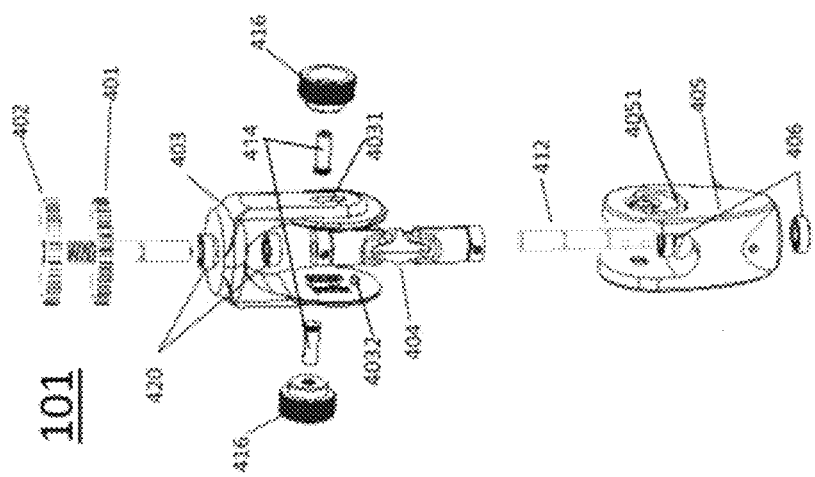

With reference to FIGS. 7A, 7B, 7C, 7D, 7E, 7F, 7G, 7H, 8A, 8B and 9, the camera mount 101 is able to resize depending on the relative positioning of the output and input section 403, 405 to ensure the smooth flow of said output and input section 403, 405. Further, the double U-joint 404 must be kept in proper alignment with respect to the selected static angle of the hinge joint 1011 of the camera mount 101. When the camera mount 101 is in the 90-degree angle position the height of the output section 403 must be slightly higher to accommodate for the two 135-degree (V) angles in the 90-degree (W) double U-joint 4041, compared to a single 90-degree angle from the hinge joint 1011 of the camera mount 101. In the 180-degree straight position 4042 as shown specifically in FIG. 7C, the camera mount 101 must necessarily resize to be shorter, since the straight position 4042 of the two joints in the double U-joint 404 has no effect on the height (Y) offset. In other words, at least two studs 414 of the input section 405 will be positioned at the highest point within at least two elongated channels 4031 of the output section 403. The self-adjusting length of the camera mount 101 due to the relative movement of the output section 403 solves the issue of the height (Z) in 4041 being greater than the height of (X) in 4042 because of the previously mentioned two 135 degree (V) angles that make up the 90-degree double U-joint 4041. In an ideal right angle with a single angle (X) of 4042 would be the height since it is half of (Y). As explained above, the at least two elongated channels 4031 are used to give the output section 403 a specific range of motion to adjust for the required height adjustment of the camera mount 101 with respect to static angle. Threaded studs 414 protruding outwardly from the input section 405 and terminating into the thumb nuts 416 also penetrate the elongated channels 4031 of the output section 403 and are therefore limited to movement within the boundary defined by said elongated channels 4031. To achieve the correct height adjustment of the camera mount 101, a guide pin 4032 on the inside of output section 403 rides inside a U-shaped guide track 4051 further comprised of a specific curve to ensure proper resize at each angle. As the camera mount 101 is adjusted from −90 to +90, the guide pin 4032 secured along the path defined by the guide track 4051 moves the output section 403 in and out accordingly and within the boundaries of the elongated channel 4031.

A worker skilled in the art would appreciate that in yet another embodiment of the present device, said device could be operated in saltwater and scuba diving conditions. For this alternative embodiment all metal parts are made of 316 marine grade stainless steel and grade-2 titanium, due to the high corrosion resistant properties they have. In another embodiment of this device, the mechanism for controlling the position of the mount is electronic. A worker skilled in the art would appreciate that an XY servo system would be used to manipulate the camera or video recording device when the servo system would receive instructions sent from a user control positioned on the handle. Further to this embodiment is the ability to control the angle of the mount from a Smart Phone, Tablet, Personal Computer or other computer system remotely.

What is claimed is:

1. A dynamic rotating monopod comprising:
    a. a handle comprised of:
        i. a directional control member to pivotally control a camera; and,
        ii. a right angle gear drive assembly;
    b. a pole connected to the handle further comprised of a drive shaft to transfer motion from the directional control member to the camera; and,
    c. a rotating camera mount connected to the pole to pivot the camera, the rotating camera mount further comprised of an input section and an output section;
    wherein the input section is operatively connected to the drive shaft and the output section is connected to the camera; and
    wherein actuating the directional control member correspondingly pivots the camera.

2. The dynamic rotating monopod of claim 1, wherein the right angle gear assembly is operatively engaged with the drive shaft, the drive shaft being constructed and arranged to fit inside a non-rotational member.

3. The dynamic rotating monopod of claim 1, wherein the handle is further comprised of a removable end cap to attach accessories to the dynamic rotating monopod.

4. The dynamic rotating monopod of claim 1, wherein the handle is further comprised of tension wheel.

5. The dynamic rotating monopod of claim 1, wherein the pole is telescopic.

6. The dynamic rotating monopod of claim 1, wherein the pole is further comprised of collar locks.

7. The dynamic rotating monopod of claim 1, wherein the camera mount is further comprised of:
    a. an input shaft to connect the drive shaft to the input section; and,
    b. an output shaft to connect output section to a tension plate.

8. The dynamic rotating monopod of claim 1, wherein the output section is further comprised of at least two elongated channels.

9. The dynamic rotating monopod of claim 1, wherein the output section is further comprised of at least two guide pins.

10. The dynamic rotating monopod of claim 1, wherein the input section is further comprised of at least two guide tracks.

11. The dynamic rotating monopod of claim 7, wherein the input and output shafts are secured to a double U-joint.

12. The dynamic rotating monopod of claim 8, wherein the input section is further comprised of at least two studs guided within the at least two elongated channels.

13. The dynamic rotating monopod of claim 10, wherein the at least two guide tracks are U-shaped.

14. A camera mount for securing a camera, comprising:
    a. an output section to pivot a camera, further comprised of:
        i. at least two elongated channels; and,
        ii. at least two guide pins to allow for the pivoting of the output section; and,
    b. an input section for receiving an input shaft, further comprised of:

i. at least two guide tracks to receive the at least two guide pins; and, ii. at least two studs to penetrate the at least two elongated channels, wherein the at least two guide pins restrictedly move along the at least two guide tracks and the at least two studs restrictedly move along the at least two elongated channels to control the movement to thereby allow for 180-degree movement of the output section relative to the input section.

15. The camera mount of claim 14 further comprised of a double U-joint.

16. The camera mount of claim 14 wherein the at least two guide tracks are U-shaped.

* * * * *